Jan. 10, 1933.  E. OVERMON  1,894,194
COMBINED STEERING HITCH AND AUTOMATIC BRAKE
Filed Jan. 18, 1932
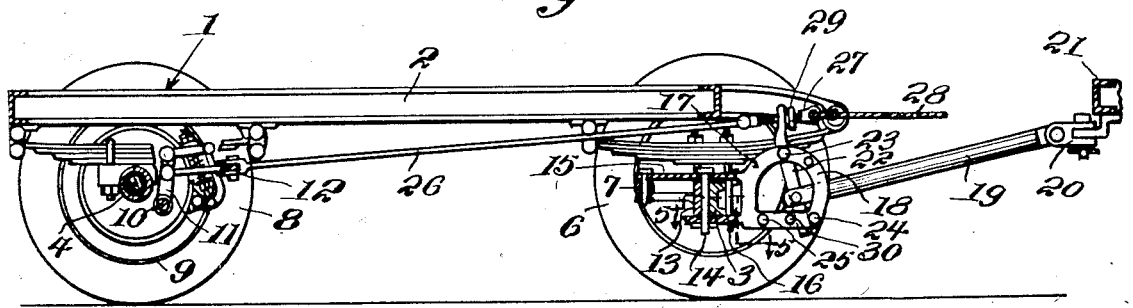
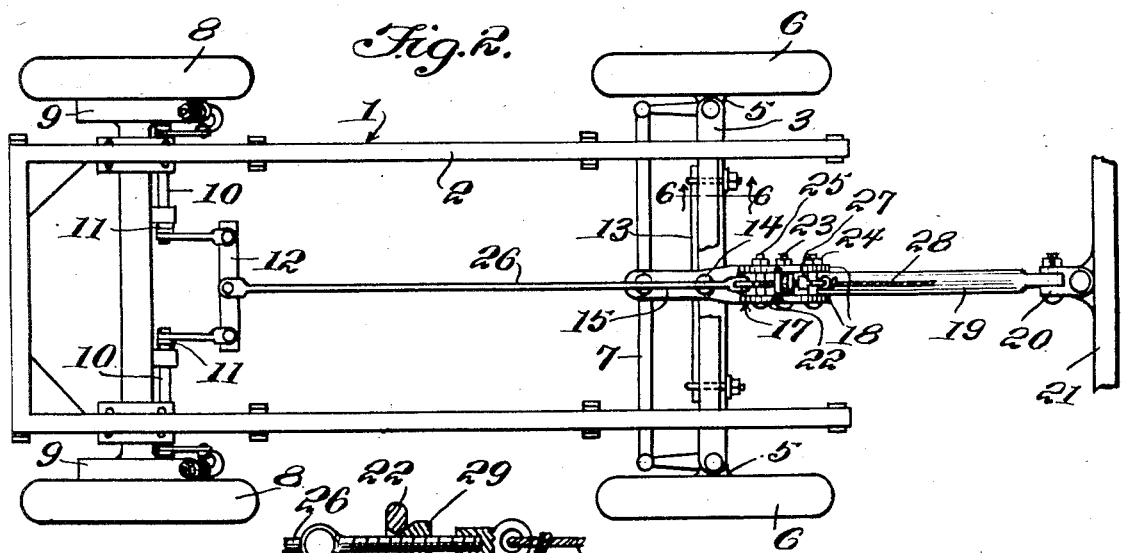
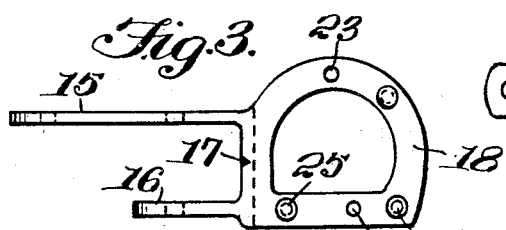
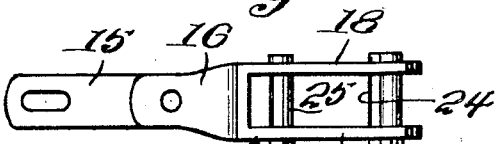
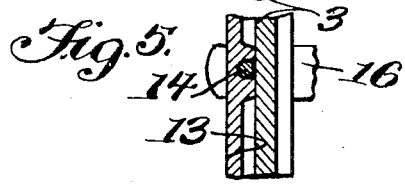
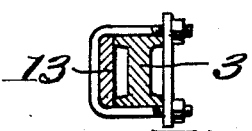
Elmer Overmon
INVENTOR
BY Victor J. Evans & Co.
ATTORNEY
WITNESS: J. T. L. Wright Patented Jan. 10, 1933

1,894,194

UNITED STATES PATENT OFFICE

ELMER OVERMON, OF SPERRY, OKLAHOMA

COMBINED STEERING HITCH AND AUTOMATIC BRAKE

Application filed January 18, 1932. Serial No. 587,384.

This invention relates to a combined hitch and automatic brake for a trailer and has for the primary object, the provision of a device of the above stated character which will provide an efficient hitch between a trailer and the towing vehicle and which will steer the trailer compelling the latter to follow in the path of the towing vehicle and also will automatically apply the brakes of the trailer when the latter under its momentum begins to travel faster than the towing vehicle or when the towing vehicle is retarded or brought to a stop.

With this and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a sectional view illustrating a trailer with a combined hitch and automatic brake applied thereto and constructed in accordance with my invention.

Figure 2 is a top plan view illustrating the same.

Figure 3 is a side elevation illustrating a portion of the hitch.

Figure 4 is a plan view illustrating a coupling between the draft tongue of the trailer and the towing vehicle.

Figure 5 is a detail sectional view taken on the line 5—5 of Figure 1.

Figure 6 is a sectional view taken on the line 6—6 of Figure 2.

Figure 7 is a fragmentary enlarged sectional view between a brake applying lever and the brake rigging or operating rod thereof.

Referring in detail to the drawing, the numeral 1 indicates a trailer of the four wheel type consisting of a chassis 2 mounted on front and rear axles 3 and 4. The front axle 3 is provided with the usual stub axles 5 and on which the front wheels 6 are journalled and steered by. The stub axles being connected by the usual link or cross arm 7. The rear axle 4 has journalled thereon rear wheels 8 having associated therewith brakes 9 of any conventional type operated by shafts 10 provided with arms 11 pivoted to an equalizing bar 12. The foregoing description relates to a well known type of trailer to which my invention is applied.

A bar 13 extends parallel with and is detachably and adjustably secured to the front axle 3 and is apertured to receive a king bolt 14 extending through spaced arms 15 and 16 which have their forward ends formed integrally with a bracket 17. The arm 15 is of a greater length than the arm 16 and is pivotally connected to the link 7 of the steering mechanism of the front wheels. The bracket 17 is in the form of a pair of relatively spaced semi-circular shaped plates 18 and has positioned therebetween the rear end of the draft tongue 19, the forward end of which is provided with a coupling 20 for attaching the tongue to a towing vehicle or draft source 21. A lever 22 is pivoted to the plates 18 as shown at 23 and its lower end operates between stops 24 and 25 carried by the plates. The rear end of the tongue 19 is pivoted to the lever 22 adjacent the latter's lower end while the upper end of the lever is provided with an opening to slidably receive a brake rod 26. The rear end of the brake rod is pivoted to the equalizing bar 12 of the brake rigging while the forward end has threaded thereto a fastener 27 to which a cable or similar flexible element 28 is secured. The cable or flexible element extends forwardly and is suitably connected to the brake mechanism of the towing vehicle so that when the brake mechanism of said vehicle is applied, a pull will be exerted on the rod 26 and apply the brakes 9 to the rear wheels of the trailer.

A nut 29 is adjustably secured to the rod 26 for engagement with the lever 22. When a pull is made upon the tongue 19 by the towing vehicle, the lower end of the lever 22 moves in engagement with the stop 24 and cooperates with the pivot 23 in transmitting the pull to the trailer and owing to the arm 15 being connected to the steering mechanism of the trailer, the latter will be caused to follow in the path of the towing vehicle. When the trailer has a tendency to travel faster than the towing vehicle, the lower end of the lever 22 moves rearwardly causing a forward motion to the upper end of the lever which imparts a pull on the brake rod 26 and applies the brakes 9 to the rear wheels of the trailer retarding the latter.

The plates 18 are provided with aligned openings 30 to receive a pin for the purpose of preventing pivotal movement of the lever 22 which is desirable when backing the trailer by the power source or the tongue 19.

While I have shown and described the preferred embodiment of my invention, it will be understood that minor changes in construction, combination and arrangement of parts may be made without departing from the spirit and scope of my invention, as claimed.

Having thus described my invention, what I claim is:

1. A combined steering hitch and automatic brake comprising a bracket pivoted to the front axle of a trailer, an arm carried by said bracket and pivoted to the steering mechanism of the trailer, spaced plates carried by said bracket, a draft tongue received between said plates and connected to a towing vehicle, a lever pivoted between said plates and pivoted to the tongue in a plane below the pivot between the plates and the lever, spaced stops carried by the plates to limit the pivotal movement of the lever, a brake mechanism of the trailer slidably connected to the upper end of the lever, and an element adjustable on the brake mechanism to engage the lever for causing operation of the brake mehanism during the pivotal movement of the lever in one direction.

2. A combined steering hitch and automatic brake comprising a bracket pivoted to the front axle of a trailer, an arm carried by said bracket and pivoted to the steering mechanism of the trailer, spaced plates carried by said bracket, a draft tongue received between said plates and connected to a towing vehicle, a lever pivoted between said plates and pivoted to the tongue in a plane below the pivot between the plates and the lever, spaced stops carried by the plates to limit the pivotal movement of the lever, a brake mechanism of the trailer slidably connected to the upper end of the lever, an element adjustable on the brake mechanism to engage the lever for causing operation of the brake mechanism during the pivotal movement of the lever in one direction, and a flexible element connected to the brake mechanism and to the brake operating means of the towing vehicle.

In testimony whereof I affix my signature.

ELMER OVERMON.